Nov. 10, 1931.  E. C. DAMROW  1,831,785
REVERSING MECHANISM FOR CURD AGITATORS AND THE LIKE
Filed Nov. 26, 1930  2 Sheets-Sheet 1
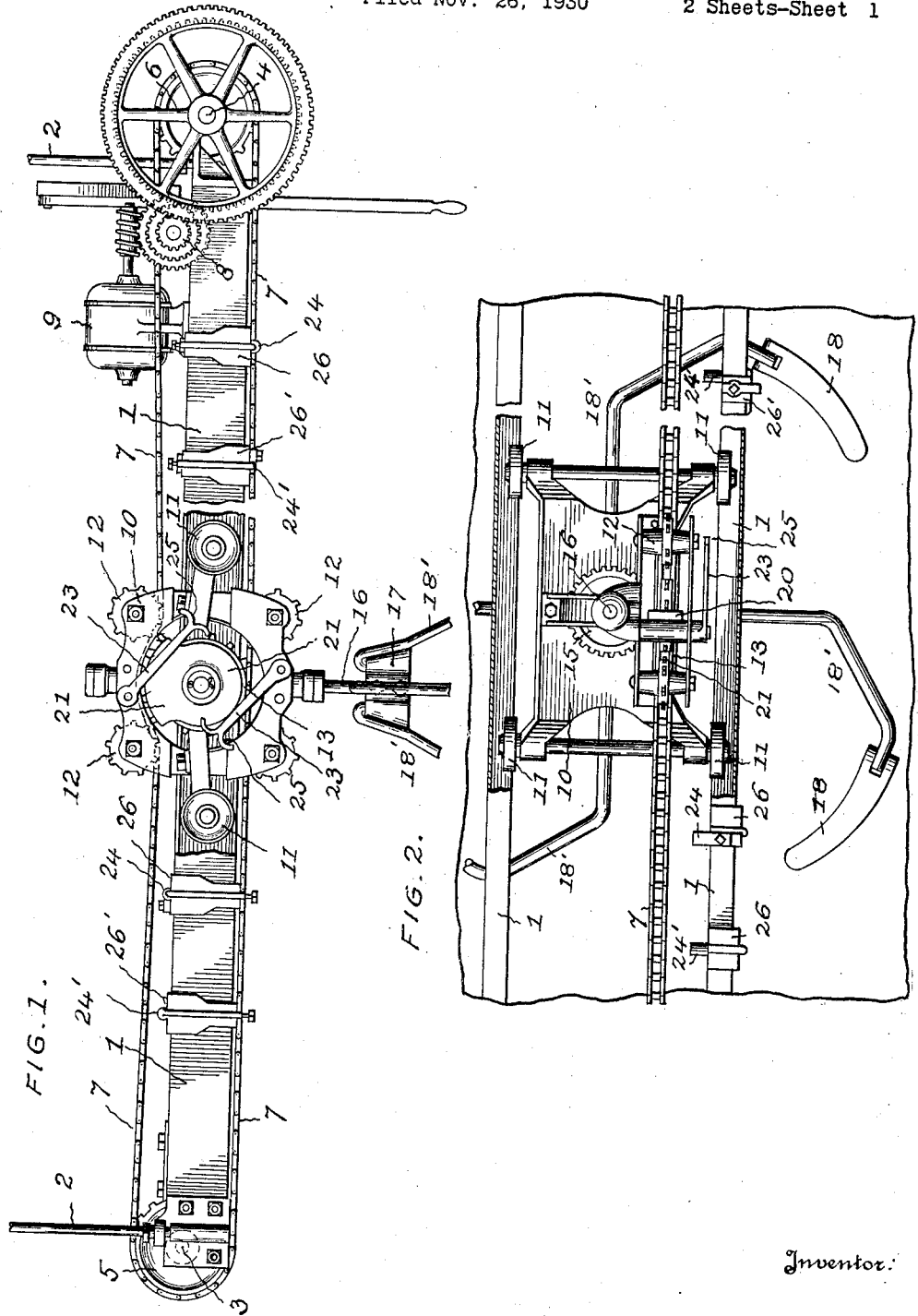
Inventor:
EDWARD C. DAMROW,
By Robert Burns,
Attorney.

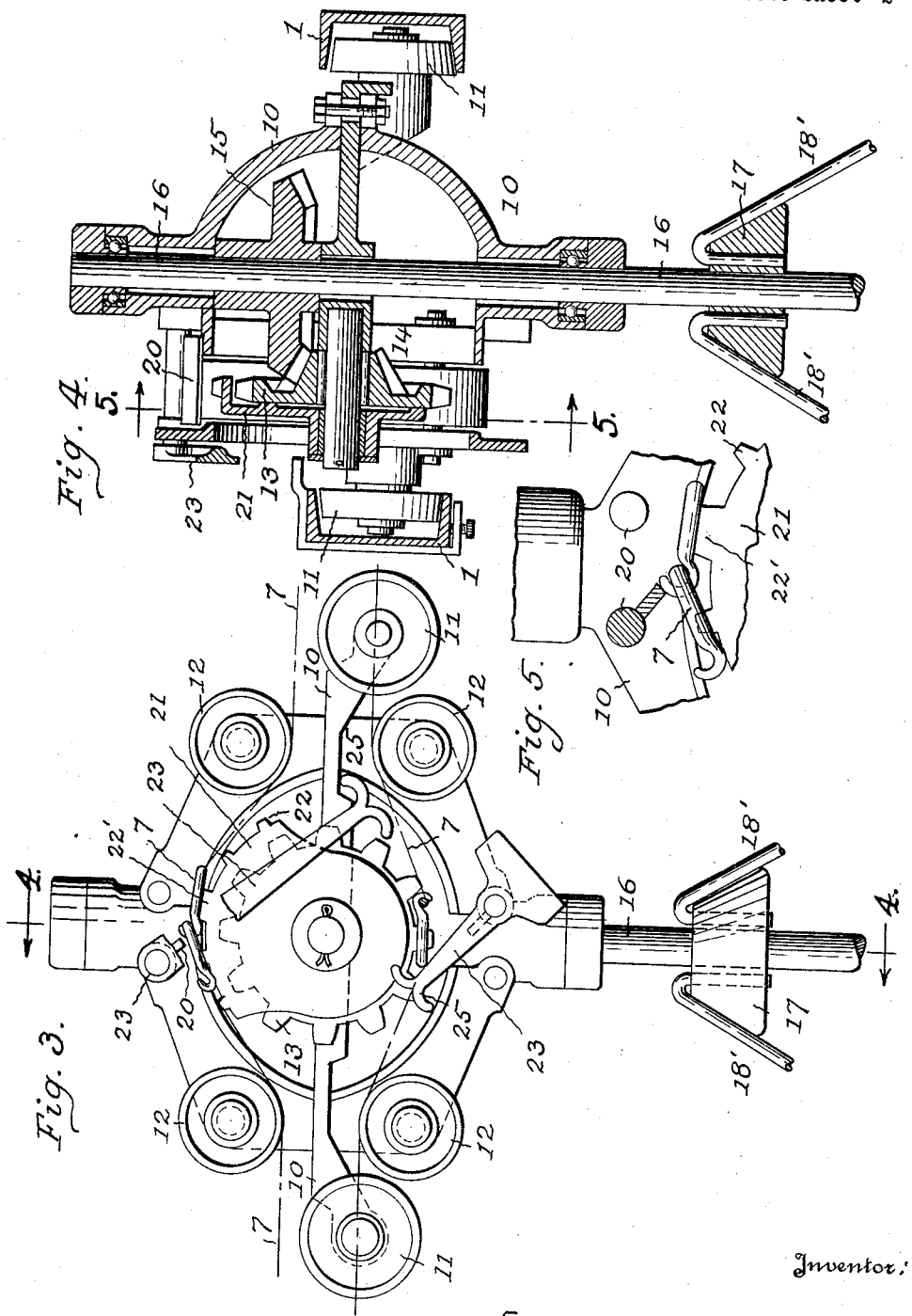

Patented Nov. 10, 1931

1,831,785

UNITED STATES PATENT OFFICE

EDWARD C. DAMROW, OF FOND DU LAC, WISCONSIN, ASSIGNOR TO DAMROW BROTHERS COMPANY, OF FOND DU LAC, WISCONSIN, A CORPORATION OF WISCONSIN

REVERSING MECHANISM FOR CURD AGITATORS AND THE LIKE

Original application filed March 17, 1930, Serial No. 436,426. Divided and this application filed November 26, 1930. Serial No. 498,348.

This application is a divisional one of my original application for patent in Method and apparatus for forking milled curd, filed March 17, 1930, Serial No. 436,426.

This invention relates to certain improvements in the subject matter of the prior Damrow Letters Patent No. 1,611,854, dated Dec. 21, 1926, and this improvement has for its object:—

To provide a structural formation of parts and elements whereby a rapid and effective reversal of the line of travel or reciprocation of the truck which carries an agitator unit or like appliance is attained in a ready and certain manner, all as will hereinafter more fully appear.

In the accompanying drawings:—

Fig. 1 is a side elevation, with parts broken away, illustrating the application of the invention to a curd agitating or forking apparatus.

Fig. 2 is a detail plan view, with parts broken away and in section, of the central part of said apparatus, showing the guide track, the carrying truck and the mechanisms associated with said truck.

Fig. 3 is an enlarged detail side elevation of the reversing mechanism, parts being broken away to show the arrangement of the mechanism by which a reversal of the travel of the truck is automatically effected.

Fig. 4 is a transverse section of the same, on line 4—4, Fig. 3.

Fig. 5 is an enlarged fragmentary section on line 5—5, Fig. 4.

Like reference numerals indicate like parts in the several views.

The curd agitating apparatus shown in the drawings as illustrative of an application of this invention is substantially the same as that of the prior Damrow Patent No. 1,611,854, of December 21, 1926, and comprises:—

An overhead track or runway 1 is suspended horizontally above the usual elongated vat of a curd agitating apparatus by suspension rods 2, and at its respective ends carries transverse shafts 3 and 4, which in turn carry sprocket wheels 5 and 6 forming the supporting means for an endless chain 7, with one of said shafts having operative connection through a change speed train of gearing 8 with the shaft of a motor 9 which is preferably mounted on the track 1 as shown.

The carriage 10 upon which the forking or agitating unit of the apparatus is mounted, is provided with track wheels 11 for rolling travel on the track 1, and at its respective corners the carriage is provided with idler sprockets 12 adapted to maintain the upper and lower stretches of the endless chain in proper operative relation with a sprocket wheel 13, now to be described.

Said sprocket wheel 13 is mounted centrally between the upper and lower stretches of the endless chain 7 by a stub shaft on the carriage 10 for alternate operative engagement with said upper and lower stretches of the chain in manner hereinafter described in detail.

An angle gear 14 has fixed association with the sprocket wheel 13 and in turn has operative connection with a companion angle gear 15 fixed on a vertical shaft 16 journalled in the carriage 10, with its lower end depending below the carriage and provided with a head 17, for the fixed attachment of the shank members 18' of the agitating or forking blades or shovels 18 of the apparatus.

As in the aforesaid Damrow Patent No. 1,611,854, the carriage 10 and mechanism mounted thereon have reciprocation from end to end of the track 1 by alternate fixed engagement between the carriage 10 and the respective upper and lower stretches of the endless chain 7, and a desirable minimum amount of time required in a change from one direction to the other is attained by means as follows:—

Upper and lower pawls 20 pivotally mounted on the frame of the carriage 10, have alternate fixed engagement with the upper and lower stretches of the endless chain 7 in an automatic manner by the following means:—

A sector shaped disk or shell 21 is revolubly mounted on the carrying shaft of the aforesaid sprocket wheel 13 and at its perimeter is provided with a lateral flange that projects over a portion of the sprocket wheel 13 and is provided with a series of sprocket teeth 22 corresponding with the sprocket teeth of the wheel 13, and in addition is formed with an intermediate sprocket tooth 22' of an enlarged form and which is alternately riding beneath the upper stretch of the endless chain 7 and above the lower stretch of said chain, is adapted to move and hold the next adjacent link of the chain 7 in fixed engagement alternately with the aforesaid upper and lower pawls 20. In the construction shown the pawls 20 are in opposed relation to each other on a line intersecting the axis of the sprocket wheel 13, so as to have alternate holding engagement with the respective upper and lower longitudinal stretches of the endless chain 7.

The described arrangement is such that with one stretch of the chain 7 in driving engagement with the sprocket wheel 13 the other stretch of said chain will be moved and held out of engagement with said sprocket wheel by the aforesaid sector disk 21 and its enlarged sprocket tooth 22', and through said tooth 22' the last mentioned stretch of the endless chain 7 will be moved into driving engagement with an adjacent pawl 20 of the carriage 10 to attain longitudinal travel of said carriage in one direction, and a consequent rotation of the shaft 16 of the apparatus.

The automatic release of operative engagement between a longitudinal stretch of the endless chain 7 and the carriage 10, as said carriage nears the end of its travel in one direction, is effected by the following means:—

Upper and lower operating arms 23 have fixed attachment to the carrying shafts of the pawls 20 aforesaid, and have an inclined arangement as shown, with their free ends moving in paths in which are arranged operating studs 24 attached to the track or runway 1 near the respective ends of the same, the arrangement being such that as the carriage 10 nears an end of its travel in one direction, an arm 23 will contact with and move upon a stud 24 at such end of the track 1, to in turn effect a movement of the pawl 20, then in holding engagement with a longitudinal stretch of the endles chain, out of such engagement.

With such construction, constant rotation of the shaft 16 takes place, while the carriage 10 has short periods of rest, which, however, only exist when active engagement between a pawl 20 and the endless chain 7 is released, and while the sector disk 21 receives a partial turning movement from said chain to bring the enlarged tooth 22' into operative contact with the portion of the chain which is in driving engagement with the sprocket wheel 13, to effect a release of such engagement and at the same time move said portion of the chain into holding engagement with the other pawl 20, to effect a travel of the carriage in an opposite direction to that first referred to. In the described turning movement of the sector disk 21, the stretch of the endless chain held out of driving engagement with the sprocket wheel 13 is permitted to return to such engagement. And as in the Damrow patent aforesaid, undue travel of the carriage 10 under inertia of movement is prevented by hook shaped bends 25 on the ends of the arms 23 which by an engagement with a stop stud 24 effects the desired stoppage of the carriage.

Having thus fully described my invention, what I claim as new, is:—

1. In a reversing mechanism of the type herein described the combination of a carriage adapted to have a forward and rearward travel, an endless chain arranged in parallel relation to the path of travel of said carriage, a sprocket wheel mounted on said carriage and having operative connection with a shaft to be driven, said sprocket wheel being adapted for alternate operative engagement with the respective stretches of the endless chain, and means for effecting such alternate engagements, the same comprising a pair of opposed pawls pivoted on the aforesaid carriage, a sector member journalled on a common axis with the aforesaid sprocket wheel, and formed with a marginal flange having overhanging relation to said sprocket wheel, said flange having an enlarged sprocket tooth adapted to move a link of the endless chain into alternate fixed engagement with said pawls, opposed operating arms associated with said pawls, and operating studs arranged in the path of said arms.

2. In a reversing mechanism of the type herein described, the combination of a carriage adapted to have a forward and rearward travel, an endless chain arranged in parallel relation to the path of travel of said carriage, a sprocket wheel mounted on said carriage and having operative connection with a shaft to be driven, said sprocket wheel being adapted for alternate operative engagement with the respective stretches of the endless chain, and means for effecting such alternate engagement, the same comprising a pair of opposed pawls pivoted on the aforesaid carriage a sector member journalled on a common axis with the aforesaid sprocket wheel, and formed with a marginal flange having overhanging relation to said sprocket wheel, said flange having sprocket teeth adapted for operative engagement with the endless chain and with an enlarged intermediate sprocket tooth adapted to move a link of the endless chain into alternate fixed engagement with said pawls, opposed operating arms associated with said pawls, and operating studs arranged in the path of said arms.

In testimony whereof I hereunto affix my signature.

EDWARD C. DAMROW.